United States Patent [19]
Toensing et al.

[11] Patent Number: 6,085,410
[45] Date of Patent: *Jul. 11, 2000

[54] SUSPENSION ASSEMBLY GRIPPING TOOL

[75] Inventors: Eyvand E. Toensing, Savage; Patrick T. Brennan, Mendota Heights, both of Minn.

[73] Assignee: Seagate Technology, Inc., Scotts Valley, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/984,316

[22] Filed: Dec. 3, 1997

Related U.S. Application Data

[60] Provisional application No. 60/055,873, Aug. 15, 1997, and provisional application No. 60/055,806, Aug. 15, 1997.

[51] Int. Cl.$^7$ ...................................... G11B 5/42
[52] U.S. Cl. .................. 29/758; 29/760; 29/764; 29/603.03; 81/302; 294/16; 294/106
[58] Field of Search ................ 29/758, 760, 764, 29/739, 747, 603.03; 81/302, 418, 424.5, 426.5; 294/16, 28, 99.2, 106

[56] References Cited

U.S. PATENT DOCUMENTS

| | | | |
|---|---|---|---|
| 833,485 | 10/1906 | Rud | 81/302 |
| 1,425,447 | 8/1922 | Brundage | 81/487 |
| 1,557,370 | 10/1925 | Lane | 81/302 |
| 1,725,613 | 8/1929 | Bolt | 81/302 |
| 2,317,512 | 4/1943 | Berkman | 81/417 |
| 2,546,616 | 3/1951 | Schaaff | 29/229 |
| 2,570,881 | 10/1951 | Stewart | 81/302 |

*Primary Examiner*—Carl E. Hall
*Attorney, Agent, or Firm*—Westman, Champlin & Kelly, PA

[57] ABSTRACT

A gripping tool for gripping a suspension assembly component of a disc drive includes a first planar gripping member connected to a second planar gripping member. The first and second planar gripping members each have respective first and second gripping surfaces that share common respective edges with respective first and second non-gripping surfaces. The first and second non-gripping surfaces having larger surface areas than the first and second gripping surfaces, respectively.

12 Claims, 8 Drawing Sheets

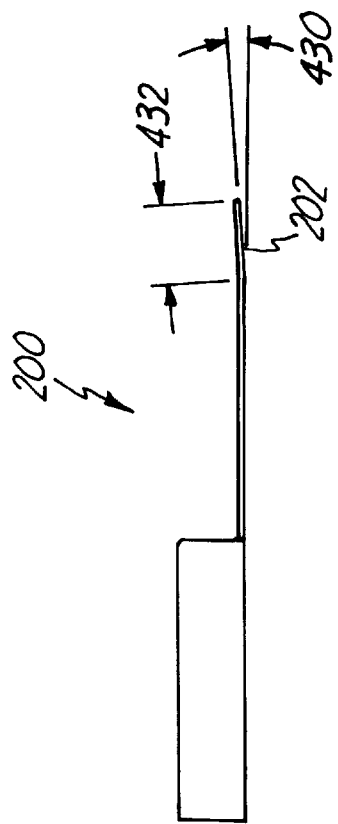
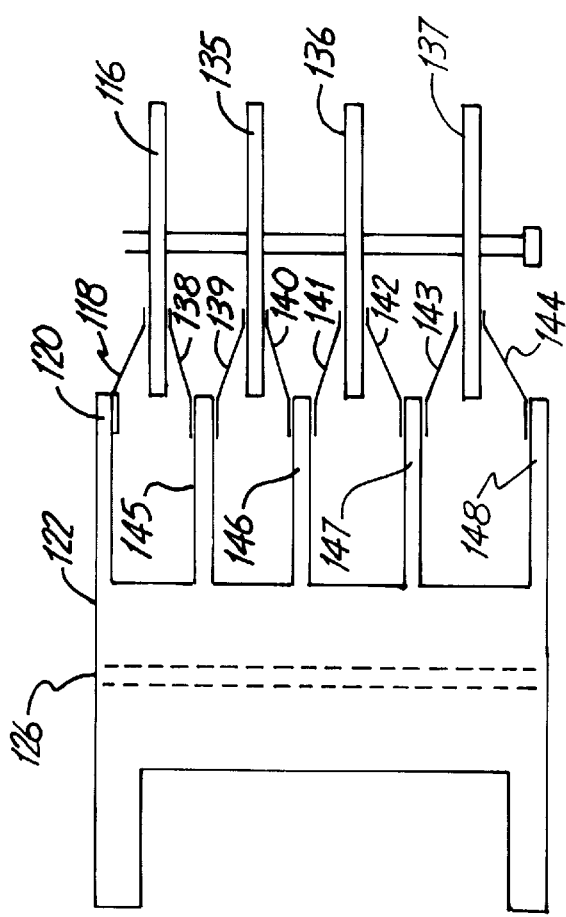

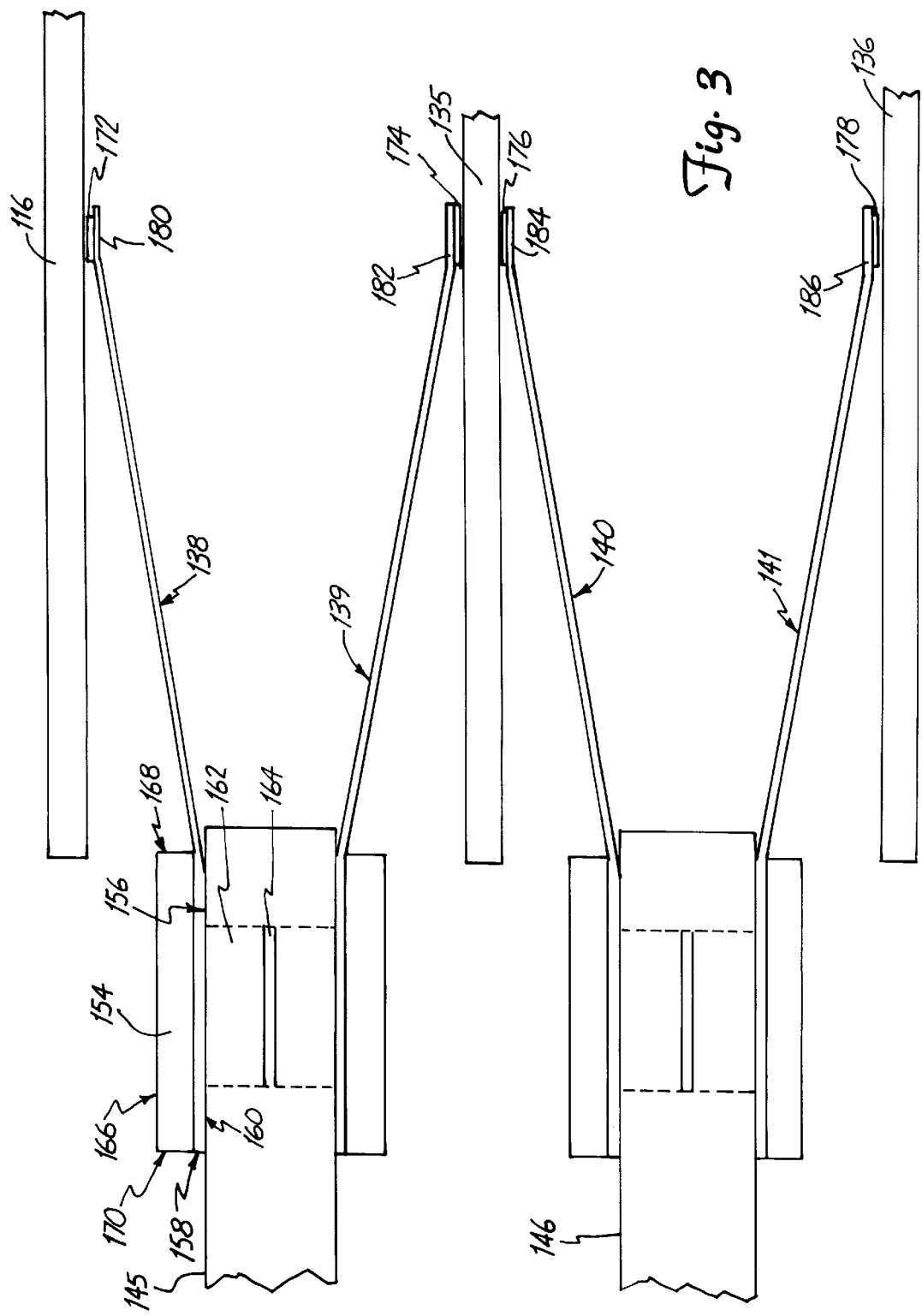

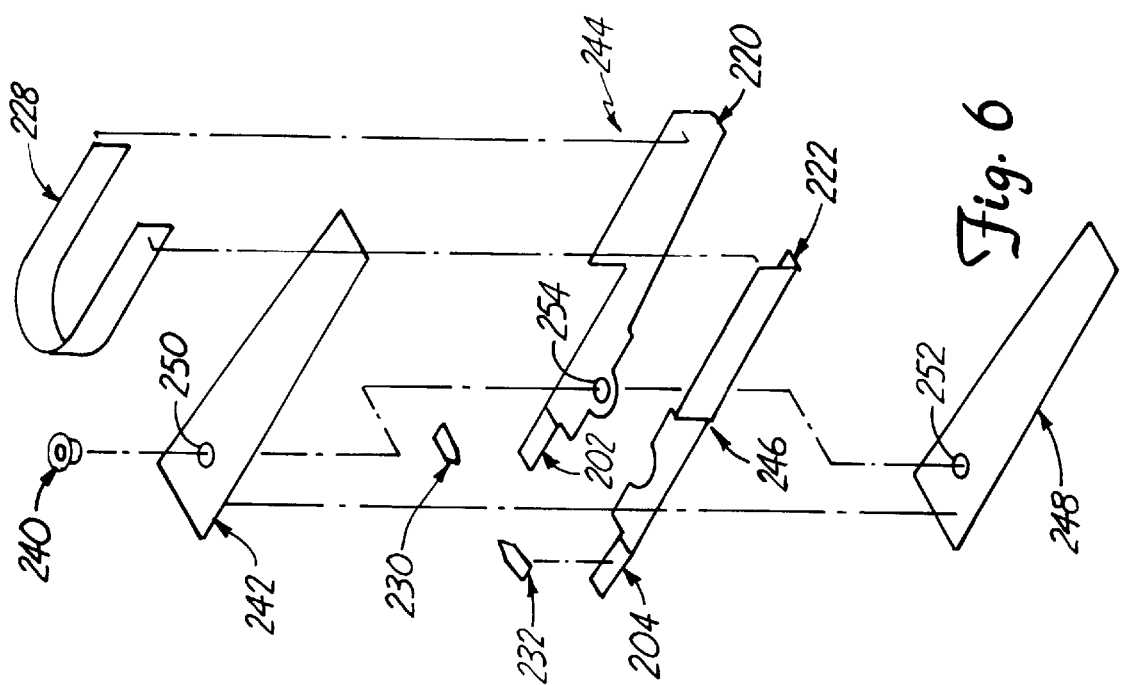
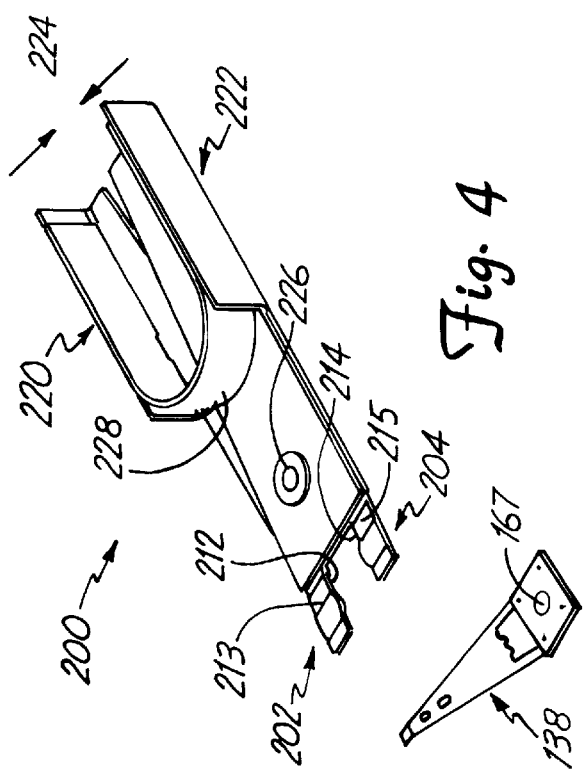
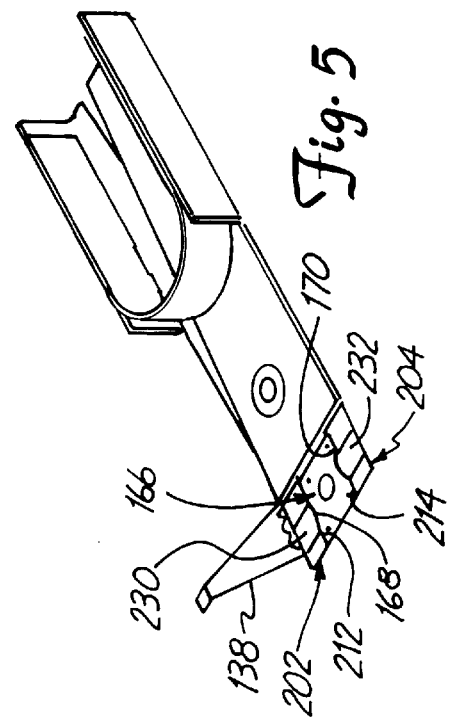

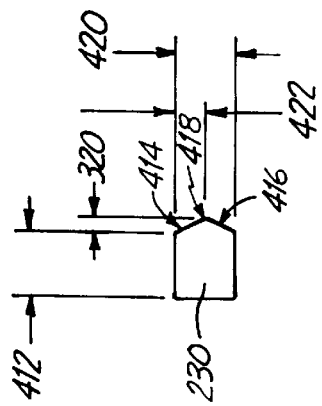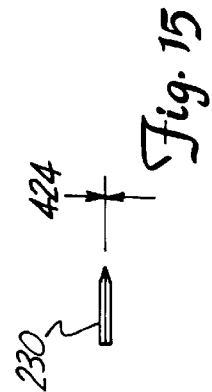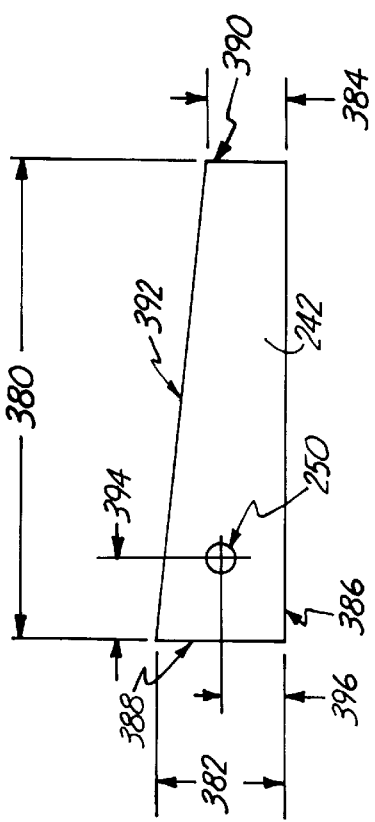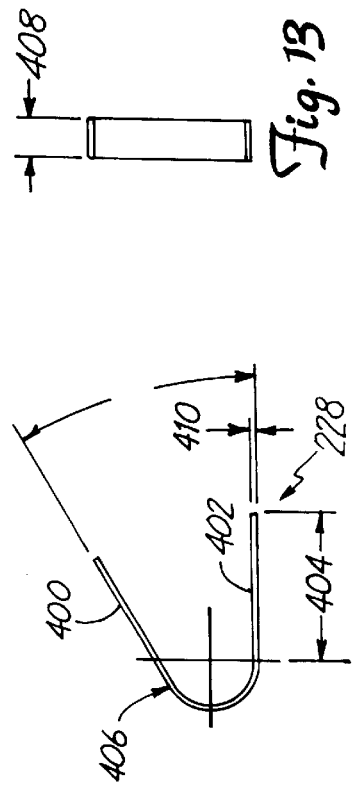

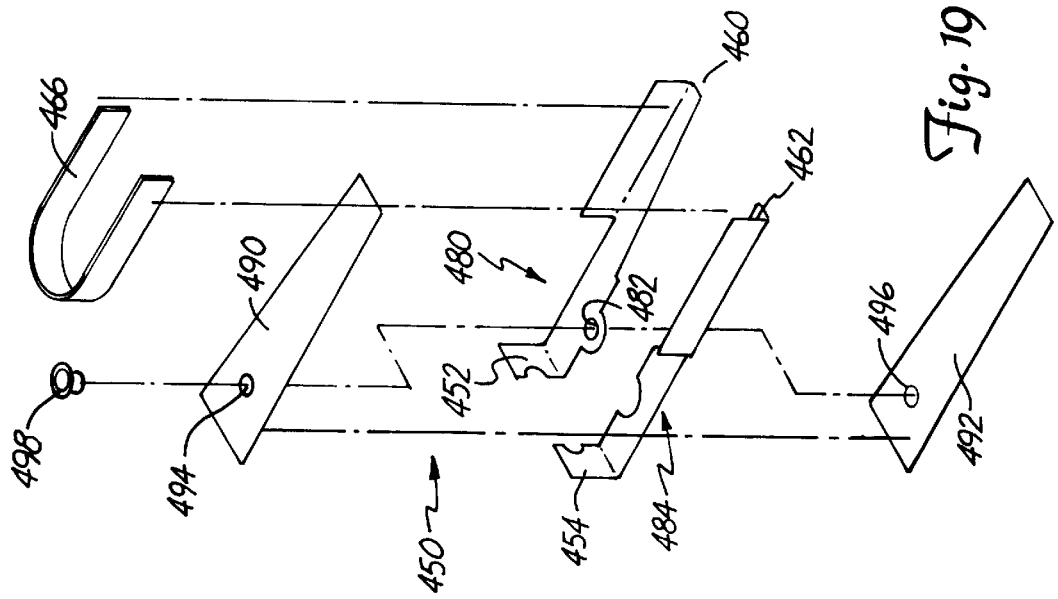
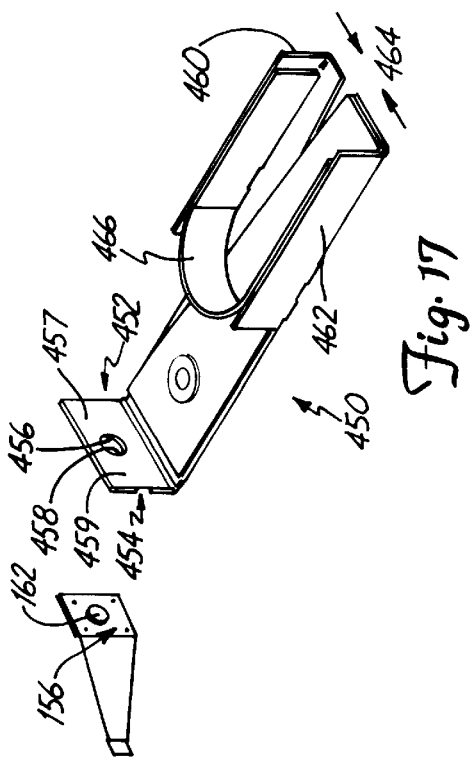
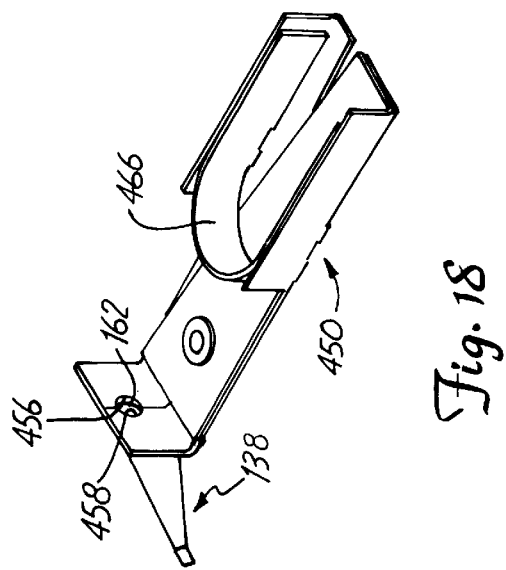

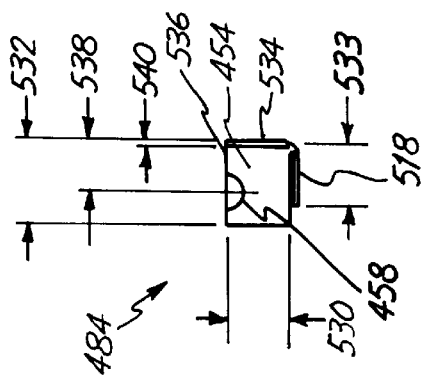
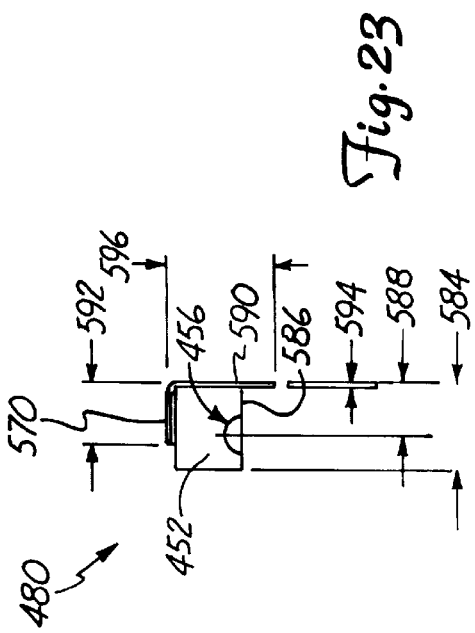
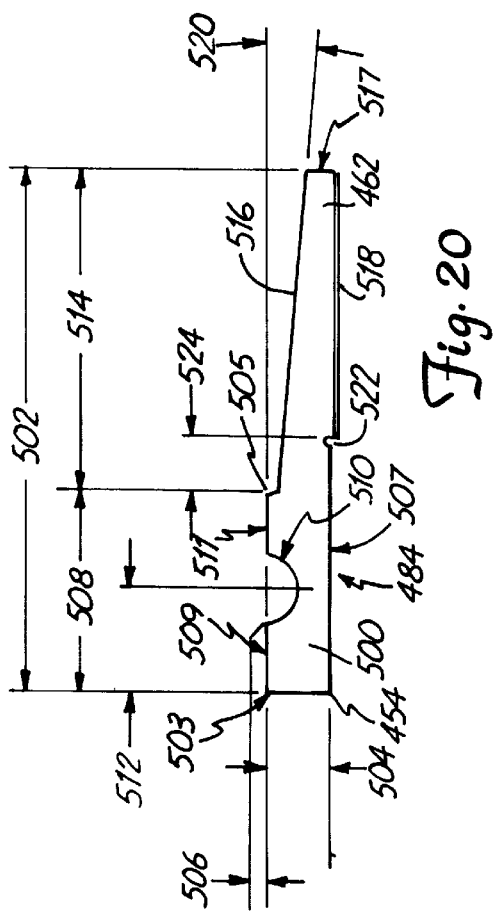
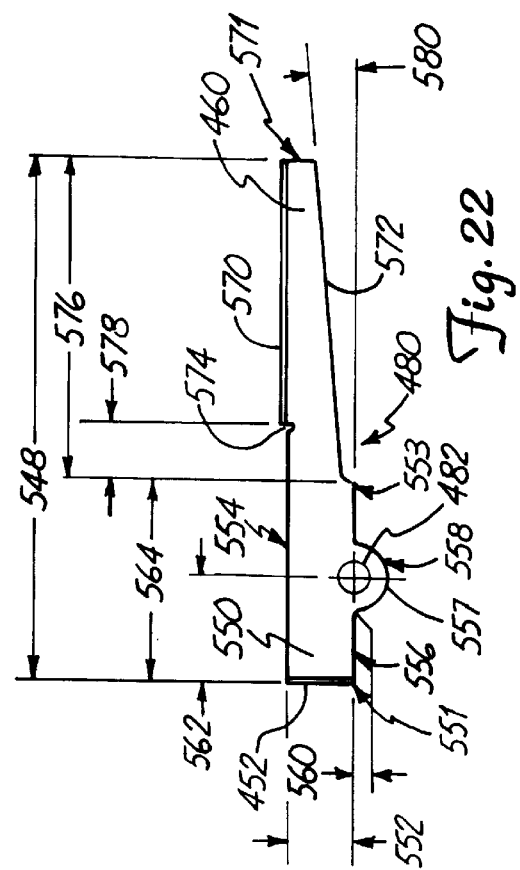

SUSPENSION ASSEMBLY GRIPPING TOOL

REFERENCE TO CO-PENDING APPLICATION

This application claims priority benefits from U.S. provisional patent application 60/055,873 entitled "HGA SWAGE BOSS TWEEZERS" filed on Aug. 15, 1997 and U.S. provisional application 60/055,806 entitled "HGA BASEPLATE TWEEZERS" filed Aug. 15, 1997.

FIELD OF THE INVENTION

The present invention relates to gripping tools. In particular, the present invention relates to gripping tools for gripping suspension assemblies.

BACKGROUND OF THE INVENTION

In data storage devices, such as magnetic disc drives and optical disc drives, it is common for a head to be positioned over a rotating disc to retrieve and/or store information on the disc. Typically, the head floats upon a thin layer of air that moves with the surface of the disc. Because this thin layer of air tends to lift the head away from the disc, a delicate suspension assembly is used to position the head over the disc and to keep the head a fixed distance from the disc. The suspension assembly is connected to a fixture having at least one track accessing arm that pivots to move the head across the radius of the disc.

The suspension assembly includes an actuator arm, a gimbal, and a slider. The slider carries the heads which are either deposited on or bonded to the slider. The gimbal is connected directly to the slider and allows the slider to pitch and roll with variations in the surface of the disc. The gimbal is also connected to the actuator arm, which includes a flexible region and a mounting region. The flexible region is between the mounting region and the gimbal, and is designed to lightly press the head toward the disc to oppose the lift produced by the movement of air under the head. The mounting region provides a mounting surface for mounting the suspension assembly to the actuator arm and is reinforced by a baseplate that is welded to the mounting region opposite the mounting surface.

To mount the suspension assembly to the fixture, the assembly must be grasped by a tool. A worker cannot install the suspension assembly with their hands because the space near the fixture is too limited.

In the prior art, tweezers were typically used to grasp the mounting region of the actuator arm. However, since these tweezers required an operator to exert a positive force on the tweezers, it was common for operators to experience muscle fatigue. In addition, since the connection to the fixture is made by pressing the mounting surface of the actuator arm against the fixture, and the tweezers typically were gripping this mounting surface, the tweezers interfered with the mounting process.

The present invention addresses these and other problems, and offers other advantages over the prior art.

SUMMARY OF THE INVENTION

A gripping tool for gripping a suspension assembly component of a disc drive includes a first planar gripping member connected to a second planar gripping member. The first and second planar gripping members each have respective first and second gripping surfaces that share common respective edges with respective first and second non-gripping surfaces. The first and second non-gripping surfaces having larger surface areas than the first and second gripping surfaces, respectively.

In some embodiments of the present invention, the first and second gripping surfaces include contours to match the shape of a portion of the suspension assembly. In several embodiments, the first and second planar gripping members are part of respective first and second members, and portions of the first and second members are located between cover plates, which connect the first and second members together.

BRIEF DESCRIPTION OF THE DRAWINGS

FIG. 2 is a side view of actuator assembly 122 of FIG. 1.

FIG. 3 is an enlarged side view of a portion of actuator assembly 122 of FIG. 2.

FIG. 4 is a perspective view of a gripping tool 200 of the present invention and suspension assembly 138 of FIG.3.

FIG. 5 is a perspective view of gripping tool 200 of FIG. 4 gripping suspension assembly 138.

FIG. 6 is an exploded view of the gripping tool 200 of FIG. 4.

FIG. 11 is a top view of cover plate 242 of FIG. 6.

FIG. 12 is a top view spring 228 of FIG. 6.

FIG. 13 is a side view of spring 228 of FIG. 6.

FIG. 14 is a top view of pad 230 of FIG. 6.

FIG. 15 is a side view of pad 230 of FIG. 6.

FIG. 16 is a side view of gripping tool 200 of FIG. 6.

FIG. 17 is a perspective view of a second embodiment of the present invention showing a gripping tool 450 and suspension assembly 138.

FIG. 18 is a perspective view of gripping tool 450 of FIG. 17 gripping suspension assembly 138.

FIG. 19 is an exploded view of gripping tool 450 of FIG. 17.

FIG. 20 is a top view of stationary member 484 of FIG. 19.

FIG. 21 is a side view of stationary member 484 of FIG. 19.

FIG. 22 is a top view of pivoting member 480 of FIG. 19.

FIG. 23 is a side view of pivoting member 480 of FIG. 19.

DETAILED DESCRIPTION OF THE PREFERRED EMBODIMENTS

Figure 1:
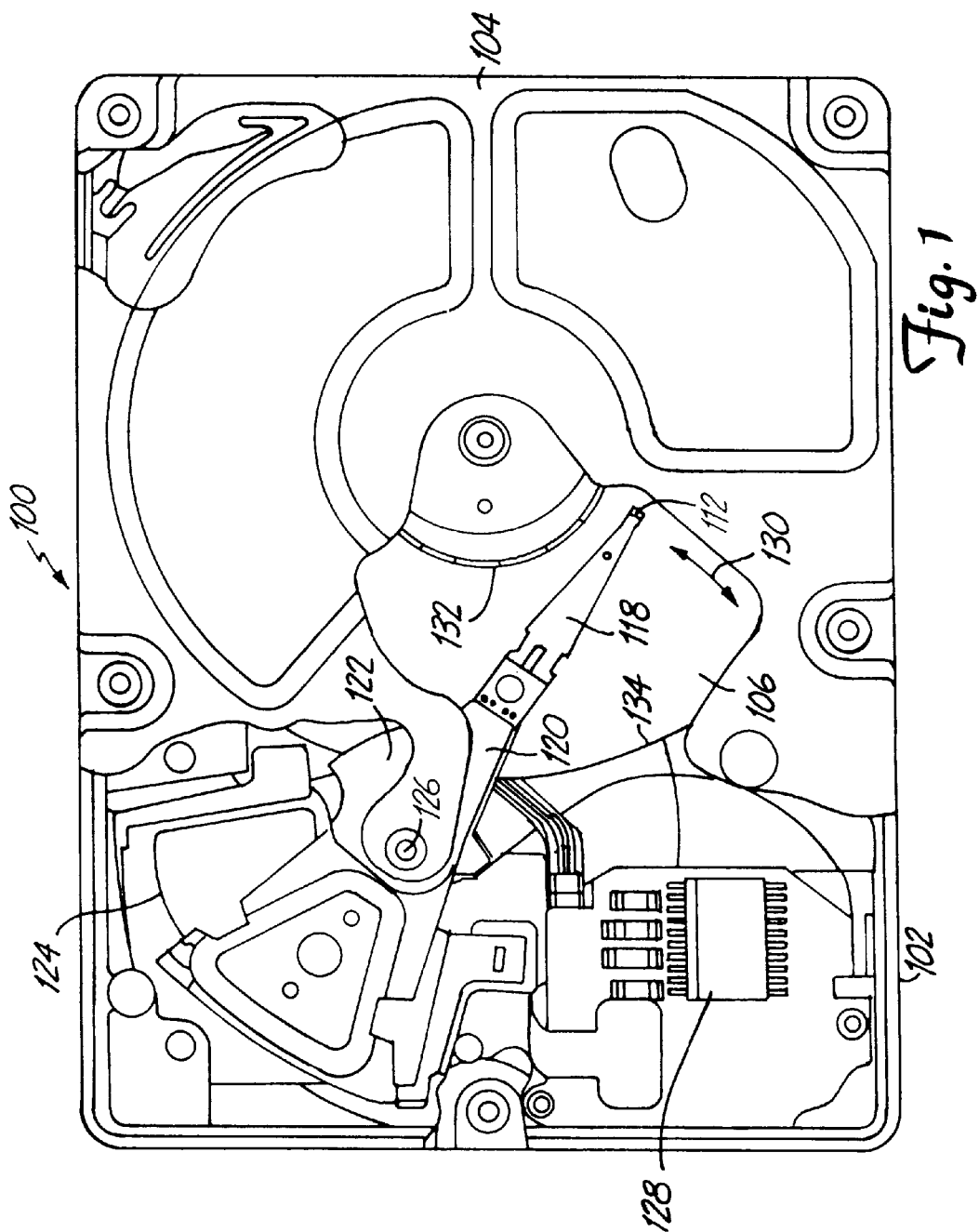
FIG. 1 is a plan view of a disc drive.

FIG. 1 is a plan view of a disc drive 100 that includes a housing with a baseplate 102 and a top cover 104 (sections of top cover 104 are removed for clarity) Disc drive 100 further includes a disc pack 106, which is mounted on a spindle motor (not shown). Disc pack 106 includes a plurality of individual discs which are mounted for co-rotation about a central axis. Each disc surface has an associated head gimbal assembly (HGA) 112 which is mounted to disc drive 100 for communication with the disc surface. Each HGA 112 includes a gimbal and a slider, which carries one or more read and write heads. Each HGA 112 is supported by a suspension 118 which is in turn attached to a track accessing arm 120, known generally as a fixture, of an actuator assembly 122.

Actuator assembly 122 preferably includes multiple track accessing arms aligned vertically in the disc drive to form an E-block assembly, so named because of its resemblance to the letter "E" when viewed from the side. Actuator assembly 122 is rotated about a shaft 126 by a voice coil motor 124, which is controlled by servo control circuitry 128 to position heads at a desired data track on the disc. HGA 112 travels along an arcuate path 130 between a disc inner diameter 132 and a disc outer diameter 134.

FIG. 2 is a side view of actuator assembly 122 showing a plurality of track accessing arms 120, 145, 146, 147 and 148 supporting suspension assemblies 118, 138, 139, 140, 141, 142, 143 and 144. Specifically, track accessing arm 120 supports suspension assembly 118. Track accessing arm 145 supports suspension assemblies 138 and 139. Track accessing arm 146 supports suspension assemblies 140 and 141. Track accessing arm 147 supports suspension assemblies 142 and 143. Track accessing arm 148 supports suspension assembly 144. The suspension assemblies are connected to their respective track accessing arms through bores passing through the ends of the track accessing arms, which are shown in more detail in FIG. 3 discussed below. The suspension assemblies suspend respective head gimbal assemblies above the surfaces of discs 116, 135, 136, and 137.

FIG. 3 is an enlarged view of track accessing arms 145 and 146; suspension assemblies 138, 139, 140 and 141; and discs 116, 135 and 136. Suspension assemblies 138, 139, 140, and 141 support gimbals 180, 182, 184, and 186, respectively, which support sliders 172, 174, 176, and 178, respectively.

Suspension assembly 138 includes a mounting region 158 having a mounting surface 156 that faces a fixture surface 160 of track accessing arm 145. A baseplate 154, having side surfaces 168 and 170 and a bottom surface 166, provides structural support to mounting region 158. Bottom surface 166 faces away from track accessing arm 145 and thus forms a non-facing surface while mounting surface 156 forms a facing or top surface. A boss 162 of suspension assembly 138 is inserted in an aperture 164 of track accessing arm 145 and is deformed to make frictional contact with the sidewalls of aperture 164, thereby connecting suspension assembly 138 to track accessing arm 145. Typically, boss 162 surrounds a bore having a central axis extending in a direction from bottom surface 166 to mounting surface 156.

The connection between suspension assembly 138 and track accessing arm 145 described above is applicable to the connection between the other suspension assemblies and their respective track accessing arms.

FIG. 4 is a perspective view of a gripping tool 200 of the present invention and suspension assembly 138 of the FIG. 3. Suspension assembly 138 includes a bore 167 and gripping tool 200 has two planar gripping members 202 and 204, which have opposing gripping surfaces 212 and 214, respectively, that share respective common edges with two non-gripping surfaces 213 and 215, respectively.

Planar gripping member 202 is connected to a leverage member 220, and is preferably made out of a single piece of material with leverage member 220. Likewise, planar gripping member 204 is connected to and preferably made out of a single material with a leverage member 222. Leverage members 220 and 222 are designed to be gripped by a human hand and may be pressed toward each other in a direction 224 so that the members pivot relative to a pivot point 226. When leverage members 220 and 222 are moved in a direction 224, they cause planar gripping members 202 and 204 to spread apart. As the pressure against leverage members 220 and 222 is reduced, a spring 228 bonded to the leverage members forces the leverage members apart, thereby forcing planar gripping members 202 and 204 together.

FIG. 5 shows gripping tool 200 of FIG. 4 gripping suspension assembly 138. In particular, gripping surfaces 212 and 214 of gripping tool 200 are in contact with side surfaces 168 and 170 of baseplate 154. Two pads 230 and 232, which are bonded to the top of planar gripping members 202 and 204, respectively, are in contact with non-facing surface 166 of baseplate 154. Pads 230 and 232 improve the user's ability to grab suspension assembly 138 by preventing planar gripping members 202 and 204 from sliding past side surfaces 168 and 170 of baseplate 154. To grab suspension assembly 138, leverage members 220 and 222 are pressed toward each other causing planar gripping members 202 and 204 to move apart from each other. Gripping tool 200 is then moved over suspension assembly 138 until pads 230 and 232 make contact with non-facing surface 166. At this point, gripping surfaces 212 and 214 will be proximate to side surfaces 168 and 170 of baseplate 154. The pressure placed on leverage members 220 and 222 is then reduced allowing spring 228 to press the leverage members apart and thereby press planar gripping surfaces 212 and 214 into gripping contact with side surfaces 168 and 170. At this point, suspension assembly 138 is held in position by gripping tool 200 without the application of any force by a user. Spring 228 applies all necessary force to keep suspension assembly 138 positioned within gripping tool 200.

FIG. 6 is an exploded view of gripping tool 200 of FIG. 4. Two cover plates 242 and 248 are bonded to a member 246, which forms planar gripping member 204 and leverage member 222. Preferably, cover plates 242 and 248 are bonded to member 246 through spot welds. Cover plate 242 has aperture 250 and cover plate 248 has aperture 252 such that apertures 250 and 252 are aligned when cover plates 242 and 248 are bonded to member 246.

A member 244, which forms planar gripping member 202 and leverage member 220, is slid between cover plates 242 and 248 until an aperture 244 in member 244 is aligned with apertures 250 and 252. An eyelet 240 is passed through apertures 250, 252 and 254 and is deformed on a backside of cover plate 248 to attach member 244 to cover plates 242 and 248. Eyelet 240 thereby connects member 244 to member 246 through cover plates 242 and 248.

To complete the tool, spring 228 is bonded to leverage members 220 and 222, and pads 230 and 232 are bonded to planar gripping members 202 and 204, respectively. Preferably, each of these bonds is made by spot welding two pieces together.

Figure 7:
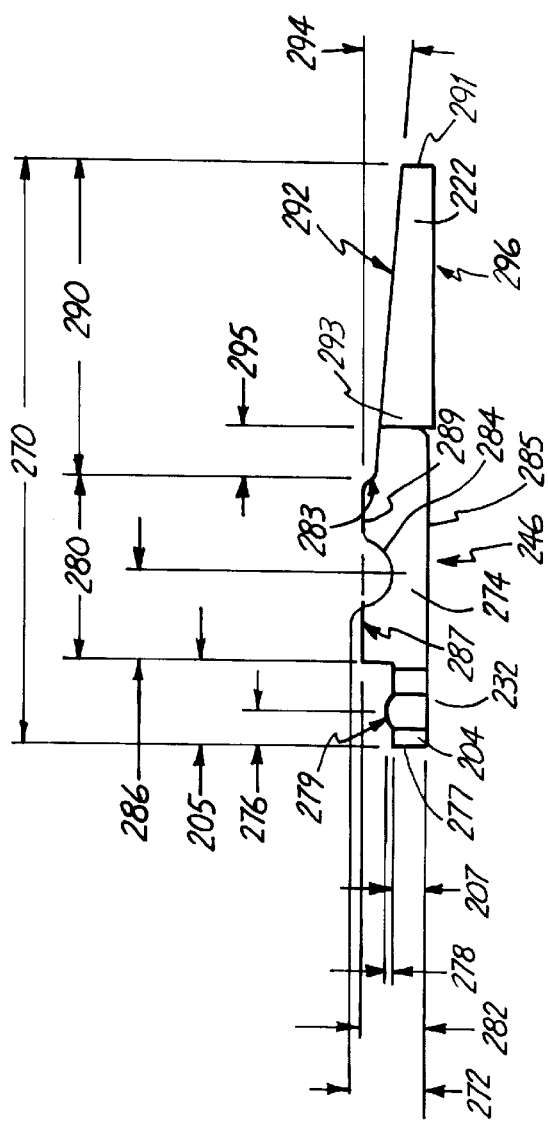
FIG. 7 is a top view of member 246 and pad 232 of FIG. 6.

FIG. 7 is a top view of member 246 and pad 232 of FIG. 6. Member 246 has a length 270 and a width 272, which are preferably equal to 1.77 inches (44.96 millimeters(mm)) and 0.2 inches (5.08 mm), respectively. Member 246 is divided into three sections: planar gripping member 204, leverage member 222, and central member 274.

Planar gripping member 204 has a length 205 and a width 207, which are preferably equal to 0.25 inches (6.35 mm) and 0.1 inches (2.54 mm), respectively. Pad 232 is bonded to planar gripping member 204 such that the center point of pad 232 is located a distance 276 from a front edge 277 of planar gripping member 204. Pad 232 has a larger width than planar gripping member 204 such that a shoulder portion 279 of pad 232 extends a distance 278 over a side edge of planar gripping member 204. Preferably, distance 276 is equal to 0.1 inches (2.54 mm) and the distance 278 of shoulder portion 279 is equal to 0.02 inches (0.508 mm).

Central member 274 has a length 280 from a front edge 281 to a back edge 283 that is preferably equal to 0.555 inches (14.10 mm). Central member 274 has straight surface 285 and a tapered surface 287. The distance between straight surface 285 and tapered surface varies along the length of tapered surface 287 and is at its smallest at leading edge 281 where the two surfaces are a distance 282 apart. Preferably, distance 282 is equal to 0.198 inches (5.03 mm). The largest separation between straight surface 285 and tapered surface 287 is distance 272 that is preferably equal to 0.2 inches (5.08 mm).

Central member 274 includes a circular notch 284 starting at the end of tapered surface 287. Circular notch 284 is based on a circle with a center located a distance 286 back from leading edge 281 of central member 274 and in line with tapered surface 287. Distance 286 is preferably equal to 0.27 inches (6.86 mm). Circle notch 284 is based on a circle that preferably has a radius of 0.1 inches (2.54 mm).

Leverage member 222 extends from trailing edge 283 of central member 274 to a trailing edge 291 of member 246, for a distance 290 that is preferably 0.965 inches (24.51 mm). Leverage member 222 has a tapered edge 292 that is at an angle 294 to a side edge 289 of central member 274. Preferably, angle 294 is equal to five degrees. Leverage member 222 also has bent portion 296 that provides a grasping area for human hands to grasp and provides a contact surface for connecting spring 228 to member 246. A notch 293 located a distance 295 from trailing edge 283 of central member 274 is provided to allow for easy formation of bent portion 296. Preferably, distance 295 is 0.345 inches (8.763 mm).

Figure 8:
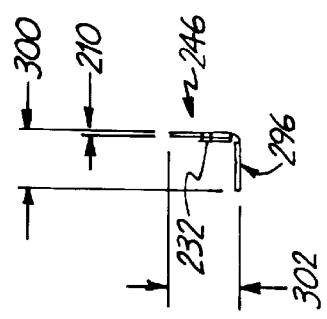
FIG. 8 is a side view of member 246 and pad 232 of FIG. 6.

FIG. 8 is a side view of member 246. Bent portion 296 has a height 300 and has an outer gripping surface that is the distance 302 from tapered surface 287 of central member 274. Height 300 is preferably 0.188 inches (4.76 mm) and distance 302 is preferably equal to 0.222 inches (5.64 mm). Member 246 has a thickness 210 that is preferably equal to 0.012 inches (0.305 mm), much less than the width 207 and length 205 of planar gripping member 204.

Figure 9:
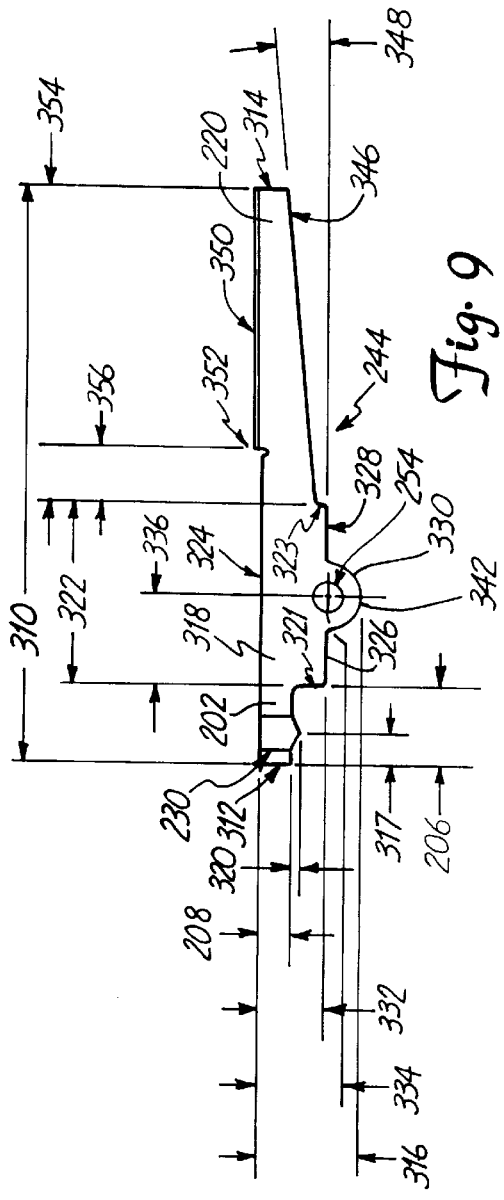
FIG. 9 is a top view of member 244 and pad 230 of FIG. 6.

FIG. 9 is a top view of member 244 of FIG. 6. Member 244 has a length 310 from a leading edge 312 to a trailing edge 314 of preferably 1.77 inches (44.96 millimeter). Member 244 has a varying width along its length 310 that has a maximum 316, which is preferably equal to 0.3 inches (7.62 mm).

Member 244 is constructed from planar gripping member 202, leverage member 220 and central portion 318. Planar gripping member 202 has a width 208 and a length 206 that are preferably equal to width 207 and length 205 of member 246. In particular, width 208 and length 206 are preferably equal to 0.1 inches (2.54 mm) and 0.25 inches (6.35 mm), respectively. Pad 230 is welded to the top of planar gripping member 202 and has a width that is greater than the width of planar member 202 such that a shoulder portion extends over an edge of planar member 202 a distance 320 that is preferably equal to 0.02 inches (0.508 mm). Pad 230 has a center located a distance 317 from leading edge 312. Preferably, distance 317 is 0.05 inches (1.27 mm).

The trailing edge of planar gripping member 202 is connected to and integrally formed with the leading edge of central portion 318, which has a length 322 from its leading edge 321 to its trailing edge 323 that is preferably equal to 0.555 inches (14.10 mm). Central portion 318 has a straight side edge 324, two tapered edges 326 and 328 and an outwardly curved edge 330. At leading edge 321, tapered edge 326 is a distance 332 from straight edge 324 and where tapered edge 326 abuts outwardly curved edge 330, tapered edge 326 is a distance 334 from straight edge 324. Preferably, distance 332 is 0.198 inches (5.03 mm) and distance 334 is 0.2 inches (5.08 mm). Outwardly curved edge 330 is based on a circle centered at a point that is in line with tapered edge 326 and is a distance 336 from leading edge 321 of central portion 318. Preferably, distance 336 is 0.27 inches (6.86 mm). The circle that forms outwardly curved edge 330 preferably has a radius of 0.1 inches (2.54 mm).

Central portion 318 also includes an aperture 254 that is centered about the center of the circle that forms outwardly curved edge 330. Aperture 254 preferably has a radius of 0.086 inches (2.184 mm).

In preferred embodiments, a small slit 342 extends from aperture 254 to outwardly curved edge 330. This slit arises due to the preferred process for manufacturing the elements of gripping tool 200. In particular, the elements of gripping tool are formed using wire EDM machining, which cuts the forms using a wire. To avoid having to break the wire to form aperture 254, the wire simply cuts from outwardly curved edge 330 directly into aperture 245. Cutting directly into outwardly curved edge 330 to form aperture 245 also improves the placement accuracy of aperture 245. The wire EDM process is preferred because it produces sharp corners at the edges of gripping surfaces 212 and 214 thereby maximizing the contact between the gripping surfaces and the suspension assembly.

Leverage member 220 has a length 354 extending from trailing edge 323 of central portion 318 to trailing edge 314 of member 244. Preferably, length 354 is 0.965 inches (24.51 mm). Leverage member 220 has a tapered edge 346 that is at an angle 348 to tapered edge 328 of central portion 318. Preferably, angle 348 is five degrees. Leverage member 220 also includes bent portion 350, which provides a grasping surface for grasping the tool and an inner surface for connecting spring 228. A notch 352 is provided to allow for proper bending of bent portion 350. Notch 352 is located a distance 356 from trailing edge 323 of central portion 318. Distance 356 is preferably 0.355 inches (9.017 mm).

Figure 10:
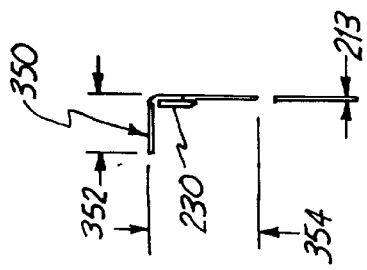
FIG. 10 is a side view of member 244 and pad 230 of FIG. 6.

FIG. 10 is a side view of member 244 showing bent portion 350 and pad 230. Bent portion 350 has a height 352 that is equal to 0.188 inches (4.76 mm). Bent portion 350 is separated from outwardly curved edge 330 by a distance 354, which is preferably equal to 0.324 inches (8.23 mm). Member 244 is preferably made out of a sheet of material having a thickness 213 of 0.012 inches (0.305 mm), which is shorter than the length 206 and width 208 of planar gripping member 202.

FIG. 11 is a top view of cover plate 242 of FIG. 6. A straight edge 386 connects a leading edge 388 to a back edge 390. Straight edge 386 is at a 90 degree angle to leading edge 388 and at a 90 degree angle to trailing edge 390. A tapered edge 392 also connects leading edge 388 to trailing edge 390. Preferably, length 380 along straight edge 386 is 1.5 inches (38.1 mm), leading width 382 along leading edge 388 is 0.4 inches (10.16 mm), and trailing width 384 along trailing edge 390 is 0.25 inches (6.35 mm). Cover plate 242 contains an aperture 250 having a center located a distance 394 from leading edge 388 and a distance 396 from straight edge 386. Preferably, distance 394 is 0.25 inches (6.35 mm) and distance 396 is 0.2 inches (5.08 mm). Preferably, aperture 250 is circular in shape having a radius of 0.086 inches (2.184 mm).

Cover plate 242 has the same dimension as cover plate 248 of FIG. 6, and the dimensions described above for cover plate 242 are applicable to cover plate 248.

FIG. 12 is a top view of spring 228 of FIG. 6. Spring 228 is preferably a single piece of material that has two straight regions 400 and 402, which each have a length 404 of preferably 0.61 inches (15.49 mm). Spring 228 further has a curved section 406 that connects straight section 400 to straight section 402. Preferably, curved section 406 is based on a circular shape having a center point located equidistant from an end of straight section 400 and an end of straight section 402. Preferably, the circle that curved section 406 is based upon has a radius of 0.21 inches (5.33 mm). Preferably, before installation of spring 228, curved section 406 results in an angle 411 between straight regions 400 and 402 that is equal to 30 degrees. Spring 228 has a thickness 410, which is preferably equal to 0.02 inches (0.508 mm). FIG. 13 is a side view of spring 228 of FIG. 12 showing that spring 228 has a height 408, which is preferably equal to 0.164 inches (4.17 mm).

FIG. 14 is an enlarged top view of pad 230 of FIG. 6. Pad 230 has a support width 412 and a shoulder width 320. Support width 412 equals width 208 of planner gripping member 202 and is preferably equal to 0.1 inches (2.54 mm). Shoulder width 320 is preferably equal to 0.02 inches (0.508 mm). The shoulder of pad 230 includes two converging edges 414 and 416 which come together at a point 418. Converging edges 414 and 416 each start at respective side edges that are a distance 420 apart. Center point 418 is equidistant from the side edges at a distance 422. Preferably, distance 420 is 0.1 inches (2.54 mm) and distance 422 is 0.05 inches (1.27 mm).

FIG. 15 is a side view of pad 230 of FIG. 14 showing that pad 230 has a thickness 424. Preferably, thickness 424 is equal to 0.005 inches (0.127 mm).

FIG. 16 is a side view of gripping tool 200 of FIG. 4. FIG. 16 shows that planar gripping members 202 and 204 are at an angle 430 to their respective central portions and leverage members. Preferably, angle 430 is equal to five degrees. The bend in planar gripping members 202 and 204 is made 0.02 inches (0.508 mm) forward of the connection point between the planar gripping members and the central portions. Thus, the bent portion of the planar gripping members has a length 432 of 0.230 inches (5.84 mm).

FIG. 17 is a perspective view of a second embodiment of the present invention showing a gripping tool 450 and suspension assembly 138. Gripping tool 450 has planar gripping members 452 and 454 which include curved gripping surfaces 456 and 458, respectively, which share a common edge with non-gripping surfaces 457 and 459, respectively. Gripping surfaces 456 and 458 can be moved apart from each other by pressing together two leverage members 460 and 462 in the direction 464. A spring 466 located between leverage members 460 and 462 force leverage members 460 and 462 apart, thereby forcing gripping surfaces 456 and 458 together.

Suspension assembly 138 includes boss 162, which extends above facing surface 156. Boss 162 is shaped such that it fits within the aperture produced between gripping surfaces 456 and 458 when leverage members 460 and 462 are pressed together.

As shown in FIG. 18, when boss 162 has been placed between gripping surfaces 456 and 458, and leverage members 460 and 462 have been released, spring 466 causes gripping surfaces 456 and 458 to hold suspension assembly 138 by boss 162. Spring 466 provides enough force that suspension assembly 138 can be held without a user applying further pressure once boss 162 is positioned within gripping surfaces 456 and 458.

FIG. 19 is an exploded diagram of gripping tool 450 of FIG. 17. Planar gripping member 452 and leverage member 460 are part of a pivoting member 480 that includes an aperture 482. Planar gripping member 454 and leverage member 462 are a part of stationary member 484.

To form gripping tool 450, stationary member 484 is bonded between cover plates 490 and 492, which contain apertures 494 and 496, respectively. Preferably, the cover plates are bonded to stationary member 484 through a series of spot welds. Pivoting member 480 is inserted between cover plates 434 and 492 to align aperture 482 with apertures 494 and 496. An eyelet 498 is passed through apertures 494, 482 and 496 and is deformed on the back side of cover plate 492, thereby securing pivoting member 480 to cover plates 494 and 492 and indirectly connecting pivoting member 480 to stationary member 484. Spring 466 is then bonded to inner surfaces of leverage members 460 and 462 while sitting on top of cover plate 490. Preferably, spring 466 is spot welded to leverage members 460 and 462.

FIG. 20 is a top view of stationary member 484 of FIG. 19. Stationary member 484 has planar gripping member 454, leverage member 462 and central portion 500 within its length 502. Preferably, length 502 is 1.56 inches (39.62 mm). Central portion 500 is connected to planar gripping member 454 at location 503, and extends to a location 505 where it is connected to leverage member 462. Central portion 500 has a tapered side edge 509, an inwardly curved edge 510, and a side edge 511 along its length 508, which is preferably 0.598 inches (15.19 mm). At location 503, tapered side edge 509 is a distance 504 from a straight side edge 507, where distance 504 is preferably 0.98 inches (5.03 mm). At the point where tapered side edge 509 meets inwardly curved edge 510, tapered side edge 509 is an additional distance 506 from straight side edge 507, where distance 506 is preferably 0.003 inches (0.076 mm).

Inwardly curved edge 510 is based upon a circle having a center a distance 512 from location 503 and even with tapered side edge 509. Preferably, distance 512 is 0.313 inches (7.95 mm).

Leverage member 462 has a length 514 from location 505 to trailing edge 517 and includes a tapered edge 516 and a grasping surface 518. Length 514 is preferably 0.962 inches (24.43 mm) and tapered edge 516 is at an angle 520 to side surface 511 that is preferably five degrees. Leverage member 462 also includes a notch 522 used in bending the material of stationary member 484 to form grasping surface 518. Notch 522 is a distance 524 from location 505, where distance 524 is preferably 0.165 inches (4.19 min).

FIG. 21 is a side view of stationary member 484 of FIG. 20 showing planar gripping member 454. Planar gripping member 454 has a width 530 and a length 532. Preferably, width 530 and length 532 are 0.198 inches (5.03 mm) and 0.253 inches (6.43 mm), respectively. Planar gripping member 454 includes curved gripping surface 458 which is based on a circle having a center aligned with a side surface 536 of planar gripping member 454. The center of the circle is separated from a bottom surface 534 of stationary member 484 by a distance 538, which is preferably 0.153 inches (3.89 mm). Grasping surface 518 has a height 533 that is preferably 0.188 inches (4.775 mm).

Preferably, stationary member 484 is constructed from a single piece of material having a thickness 540 that is equal to 0.012 inches (0.305 mm), which is less than width 530 and length 532 of planar gripping member 454.

FIG. 22 is a top view of pivoting member 480 of FIG. 19. Pivoting member 480 has a length 548 that encompasses planar gripping member 452, leverage member 460, and central portion 550. Preferably, length 548 is 1.56 inches (39.62 mm). Planar gripping member 452 has a width 552 that is preferably 0.198 inches (5.03 mm).

Planar gripping member 452 is connected to and integrally formed with central portion 550 at location 551. Central portion 550 has straight surface 554, tapered surface 556 and outwardly curved surface 558. Tapered surface 556 is distance 552 from straight surface 554 near planar gripping member 452 and projects away from straight surface 554 so that at its connection point to outwardly curved surface 558 is an additional distance 560 from straight surface 554. Preferably, distance 560 is 0.003 inches (0.076 mm).

Outwardly curved surface 558 is preferably circular and based upon a circle having a center in line with tapered surface 556 and located a distance 562 from location 551. Distance 562 is preferably 0.313 inches (7.95 mm) and the circle that outwardly curved surface 558 is based upon preferably has a radius of 0.1 inches (2.54 mm).

Central portion 550 also includes an aperture 482 that is preferably circular and based upon a circle that is centered at the same point as the circle that forms outwardly curved surface 558. The radius of aperture 482 is preferably 0.086 inches (2.184 mm). A slit 557 extends between aperture 482 and outwardly curved surface 558.

Central portion 550 has a length 564 from location 551 to location 553 where it is connected to and integral with leverage member 460. Preferably, length 564 is 0.598 inches (15.19 mm).

Leverage member 460 has grasping surface 570, tapered surface 572 and notch 574. Leverage member 460 has a length 576 measured from location 553 to trailing edge 571. Preferably, length 576 is 0.962 inches (24.43 mm). Notch 574 is a distance 578 from location 553 and this distance is preferably 0.162 inches (4.11 mm). Tapered surface 572 is at an angle 580 to tapered edge 556 of central portion 550. Preferably, angle 580 is five degrees.

FIG. 23 is a side view of pivoting member 480 of FIG. 22. FIG. 23 shows planar gripping member 452, which has a length 584 of preferably 0.198 inches (5.03 mm). Planar gripping member 452 includes curved gripping surface 456, which is preferably a circular curved surface based on a circle having a center aligned with a straight surface 586 of planar gripping member 452. The center of the circle is a distance 588 from a bottom surface 590 of pivoting member 480. Preferably, distance 588 is 0.153 inches (3.89 mm) and the diameter of the circle forming curved surface 456 is preferably 0.053 inches (1.35 mm).

Bending portion 570 has a height 592 that is preferably 0.188 inches (4.78 mm) and bending portion 570 is preferably made out of the same piece of material as the remainder of pivoting member 480 and thus has the same thickness 594, which is preferably 0.012 inches (0.305 mm). This thickness is less than the length 584 and width 552 of planar gripping member 452.

The distance from the side of grasping surface 570 to the outer most portion of outwardly curved surface 558 is shown in FIG. 23 as distance 596. This distance is preferably 0.324 inches (8.23 mm).

Cover plates 490 and 492 of FIG. 19 have identical dimensions to cover plate 242 of FIG. 11, and as such are not repeated in the figures. Similarly spring 466 has identical dimensions to spring 228 of FIG. 12 and FIG. 13.

In summary, gripping tools 200 and 450 are disclosed for gripping a suspension assembly 138. Gripping tools 200 and 450 have first members 246 and 484, respectively, that have first planar gripping members 204 and 454, respectively. The first planar gripping members 204 and 454 have first gripping surfaces 214 and 458, respectively, and first non-gripping surfaces 215 and 459, respectively, the non-gripping surfaces having larger surface areas than the gripping surfaces. Gripping tools 200 and 450 also have second planar gripping members 202 and 452, respectively. Second planar gripping members 202 and 452 have second gripping surfaces 212 and 456, respectively, that share a common edge with second non-gripping surfaces 213 and 457, respectively. Spring mechanisms 228 and 466 in gripping tools 200 and 450, respectively, oppose movement of the respective first gripping surface away from the respective second gripping surface.

The first gripping surface 214 of gripping tool 200 contacts a first side surface 170 of suspension assembly 138. The second gripping surface 212 contacts a second side surface 168 of suspension assembly 138. First side surface 170 and second side surface 168 extend between two surfaces 166 and 156 of suspension assembly 138.

Gripping tools 200 and 450 are designed to grip a mounting member 138, which has a bore 167 with a central axis extending through a top surface 156 and a bottom surface 166. Gripping tool 200 includes first gripping surface 214 that contacts a first side surface 170 of mounting member 138 and a second gripping surface 212 that contacts a second side surface 168 of mounting member 138. Gripping tool 450 includes a first gripping surface 458 that contacts a first side surface of boss 162 and a second gripping surface 456 that contacts a second side surface of boss 162.

Gripping tools 200 and 450 include cover plates 242, 248 and 490, 492, respectively, between which the respective members of the gripping tools reside.

Although specific values have been given to describe the dimensions of the two embodiments of the gripping tool, those skilled in the art will recognized that changes to these dimensions may be made while remaining within the spirit and scope of the invention. In particular, the size of the apertures in the cover plate and the pivoting members may be changed to accommodate different sized eyelets. In addition, the curved gripping surfaces in the second embodiment may be enlarged or reduced to accommodate different sized bosses on different suspension assemblies. Furthermore, the shape of the curved gripping surfaces of the second embodiment may be changed to fit bosses of different shapes.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the gripping tool while maintaining substantially the same functionality without departing from the scope and spirit of the present invention.

What is claimed is:

1. A gripping tool for gripping a suspension assembly component of a disc drive, the suspension assembly designed to be attached to a fixture arm, the gripping tool comprising:

a first gripping member made of a single sheet of material that includes a bend separating a spring contact surface from a top surface of a gripping extension, the gripping extension having a first gripping surface for contacting a first side surface of the suspension assembly, the first gripping surface having a thickness substantially equal to or less than the thickness of the sheet of material, the bend being such that the spring contact surface extends only above the top surface of the gripping extension;

a second gripping member having a second gripping surface for contacting a second side surface of the suspension assembly, the second gripping surface having a thickness substantially equal to the thickness of the sheet of material; and a spring, connected between the first gripping member and the second gripping member, which resiliently resists movement of the first gripping surface away from the second gripping surface.

2. The gripping tool of claim 1 wherein the first gripping surface and the second gripping surface are substantially planar.

3. The gripping tool of claim 1 wherein the spring provides sufficient force to hold the suspension assembly when the first gripping surface is in contact with the first side surface and the second gripping surface in contact with the second side surface.

4. The gripping tool of claim 1 further comprising a cover plate connected to the first gripping member at a pivot point and connected to the second gripping member.

5. The gripping tool of claim 4 further comprising a second cover plate, a portion of the first gripping member and a portion of the second gripping member located between the first cover plate and the second cover plate.

6. The gripping tool of claim 5 wherein the first cover plate is connected to the second cover plate through a hole in the first gripping member.

7. The gripping tool of claim 1 wherein the first gripping surface applies a force in a direction toward the second gripping surface when the first gripping surface is in contact with the first side surface and the second gripping surface is in contact with the second side surface.

8. The gripping tool of claim 1 further comprising a shoulder member bonded to the first gripping member for contacting a free surface of the suspension assembly when the first gripping surface contacts the first side surface.

9. A gripping apparatus for gripping a mounting member of a disc drive, the mounting member having a bore, a top surface and a bottom surface, the bore having a central axis passing through the top surface and the bottom surface, the gripping apparatus comprising:

a first member formed of a single sheet of bent material and having a first spring support section connected to a spring and a first gripping surface for contacting a first side surface of the mounting member, wherein the first side surface and the first gripping surface have a substantially same thickness;

a second member having a second gripping surface for contacting a second side surface of the mounting member, wherein the second side surface and the second gripping surface have a substantially same thickness; and a spring connected to the first spring support section and the second member to oppose movement of the first gripping surface away from the second gripping surface, the spring positioned completely above a plane containing the first gripping surface and the second gripping surface.

10. The gripping apparatus of claim 9 wherein the mounting member further comprises a boss and the first side surface is a surface of the boss and the second side surface is a surface of the boss.

11. The gripping apparatus of claim 10 wherein the first gripping surface is contoured to a shape of a portion of the boss.

12. The gripping apparatus of claim 9 further comprising first and second cover plates, portions of the first member and the second member residing between the first and second cover plates.

\* \* \* \* \*

UNITED STATES PATENT AND TRADEMARK OFFICE
CERTIFICATE OF CORRECTION

PATENT NO. : 6,085,410
DATED : July 11, 2000
INVENTOR(S) : Eyvand E. Toensing et al.

It is certified that error appears in the above-identified patent and that said Letters Patent is hereby corrected as shown below:

Under Item [56] References Cited U.S. PATENT DOCUMENTS
Insert --

| | | |
|---|---|---|
| 4,452,106 | 06/05/84 | Tartaglia..................81/43 |
| 3,998,174 | 12/21/76 | Saunders............113/120 H |
| 4,528,835 | 07/16/85 | Ekmark..................72/301 |
| 4,318,313 | 03/09/82 | Tartaglia..................81/43 |
| 2,818,866 | 01/07/58 | Thomas...............128/334 |
| 4,009,899 | 03/01/77 | Johnson..................294/33 |
| 3,496,807 | 02/24/70 | Jones et al..................81/43 |
| 3,981,527 | 09/21/76 | Ciano..................294/99 R |
| 4,437,362 | 03/20/84 | Hurst......................81/43 |
| 2,861,833 | 11/25/58 | H. Nierhaus............292/322 |
| 5,611,519 | 03/18/97 | Garcia.................. 254/22 |
| 952,095 | 03/15/10 | E.A. Bole..................294/97 |
| 2,944,451 | 07/12/60 | C.W. Vandament......81/426.5 |
| 4,649,634 | 03/17/87 | Mykkanen................29/751 |
| 3,291,476 | 12/13/66 | F.B. Calkin............269/254R |
| 4,709,206 | 11/24/87 | Edwards et al..........324/158 |
| 4,870,876 | 10/03/89 | Rodriquez..............81/426.5 |
| 4,938,514 | 07/03/90 | D'Addezio................294/16 |
| 5,826,467 | 10/27/98 | Huang....................81/302 |

UNITED STATES PATENT AND TRADEMARK OFFICE
CERTIFICATE OF CORRECTION

PATENT NO. : 6,085,410
DATED : July 11, 2000
INVENTOR(S) : Eyvand E. Toensing et al.

It is certified that error appears in the above-identified patent and that said Letters Patent is hereby corrected as shown below:

| | | | |
|---|---|---|---|
| 3,676,912 | 07/18/72 | Anhalt et al. | 29/203H |
| 2,616,315 | 11/04/52 | B.M. Caldwell | 72/392 |
| 1,989,918 | 02/05/35 | W. Drypolcher | 254/28 |
| 3,923,191 | 12/02/75 | Johnson | 220/94R |

Signed and Sealed this

Fourteenth Day of August, 2001

*Attest:*

*Attesting Officer*

NICHOLAS P. GODICI
*Acting Director of the United States Patent and Trademark Office*